(12) United States Patent
Gao et al.

(10) Patent No.: US 8,203,951 B2
(45) Date of Patent: *Jun. 19, 2012

(54) SYSTEM AND METHOD FOR FORWARDING MESSAGES

(75) Inventors: Xiaofeng Gao, Alpharetta, GA (US); David Scott, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 860 days.

This patent is subject to a terminal disclaimer.

(21) Appl. No.: 12/116,757

(22) Filed: May 7, 2008

(65) Prior Publication Data

US 2008/0205605 A1    Aug. 28, 2008

Related U.S. Application Data

(63) Continuation of application No. 10/201,701, filed on Jul. 23, 2002, now Pat. No. 7,379,421.

(51) Int. Cl.
*G01R 31/08* (2006.01)

(52) U.S. Cl. .................................. 370/230.1; 379/93.24

(58) Field of Classification Search ............... 370/230.1; 455/567; 379/93.24
See application file for complete search history.

(56) References Cited

U.S. PATENT DOCUMENTS

| | | | |
|---|---|---|---|
| 4,985,914 A | 1/1991 | Fukunaga | |
| 5,367,609 A | 11/1994 | Hopper et al. | |
| 5,379,340 A | 1/1995 | Overend et al. | |
| 5,612,869 A | 3/1997 | Letzt et al. | |
| 5,793,970 A | 8/1998 | Fakes et al. | |
| 5,797,103 A | 8/1998 | Duda | |
| 5,864,762 A | 1/1999 | Childress et al. | |
| 5,870,454 A | 2/1999 | Dahlen | |
| 5,943,402 A | 8/1999 | Hamel et al. | |
| 6,173,259 B1 | 1/2001 | Bijl et al. | |
| 6,298,326 B1 | 10/2001 | Feller | |
| 6,459,774 B1 | 10/2002 | Ball et al. | |
| 6,473,517 B1* | 10/2002 | Tyan et al. | 382/105 |
| 6,505,163 B1 | 1/2003 | Zhang et al. | |
| 6,553,021 B1* | 4/2003 | Bishop et al. | 370/347 |
| 6,633,846 B1 | 10/2003 | Bennett et al. | |
| 6,687,339 B2 | 2/2004 | Martin | |
| 6,690,774 B1* | 2/2004 | Chang et al. | 379/88.23 |
| 6,791,540 B1* | 9/2004 | Baumberg | 345/419 |
| 6,819,658 B1* | 11/2004 | Agarwal et al. | 370/316 |
| 6,865,161 B1* | 3/2005 | Sponaugle et al. | 370/352 |
| 6,920,425 B1 | 7/2005 | Will et al. | |
| 7,149,208 B2 | 12/2006 | Mattaway et al. | |
| 7,379,421 B1* | 5/2008 | Gao et al. | 370/230.1 |
| 2002/0116464 A1* | 8/2002 | Mak | 379/93.24 |
| 2002/0124057 A1 | 9/2002 | Besprosvan | |

(Continued)

OTHER PUBLICATIONS

Handley, et al. "SIP: Session Initiation Protocol", Mar. 1999.

(Continued)

*Primary Examiner* — Ricky Ngo
*Assistant Examiner* — Phuomgchau B Nguyen

(57) ABSTRACT

A system and method for forwarding voice messages is presented. One embodiment of the system comprises a voice message recorder configured to record a voice message, and a call controller configured to attach the recorded voice message to an electronic message and forward the electronic message to a predetermined forwarding address. One embodiment of the method can be broadly summarized as receiving a voice message from a caller in response to a pre-recorded voice prompt, recording the received voice message, and preparing and delivering an electronic message with the voice message attached to the electronic message.

9 Claims, 14 Drawing Sheets

U.S. PATENT DOCUMENTS

| | | |
|---|---|---|
| 2003/0035529 A1 | 2/2003 | Baker |
| 2003/0063590 A1 | 4/2003 | Mohan et al. |
| 2003/0081833 A1* | 5/2003 | Tilton .......................... 382/173 |
| 2003/0110286 A1* | 6/2003 | Antal et al. .................. 709/236 |
| 2006/0031364 A1 | 2/2006 | Hamilton et al. |
| 2007/0143106 A1 | 6/2007 | Dunsmuir |
| 2007/0149116 A1* | 6/2007 | White et al. ................ 455/3.06 |

OTHER PUBLICATIONS

Silver; U.S. Appl. No. 10/210,726, filed Jul. 31, 2002.
Silver; Non-Final Rejection mailed Apr. 13, 2004, U.S. Appl. No. 10/210,726, filed Jul. 31, 2002.
Silver; Notice of Abandonment mailed Jul. 12, 2005, U.S. Appl. No. 10/210,726, filed Jul. 31, 2002.

* cited by examiner

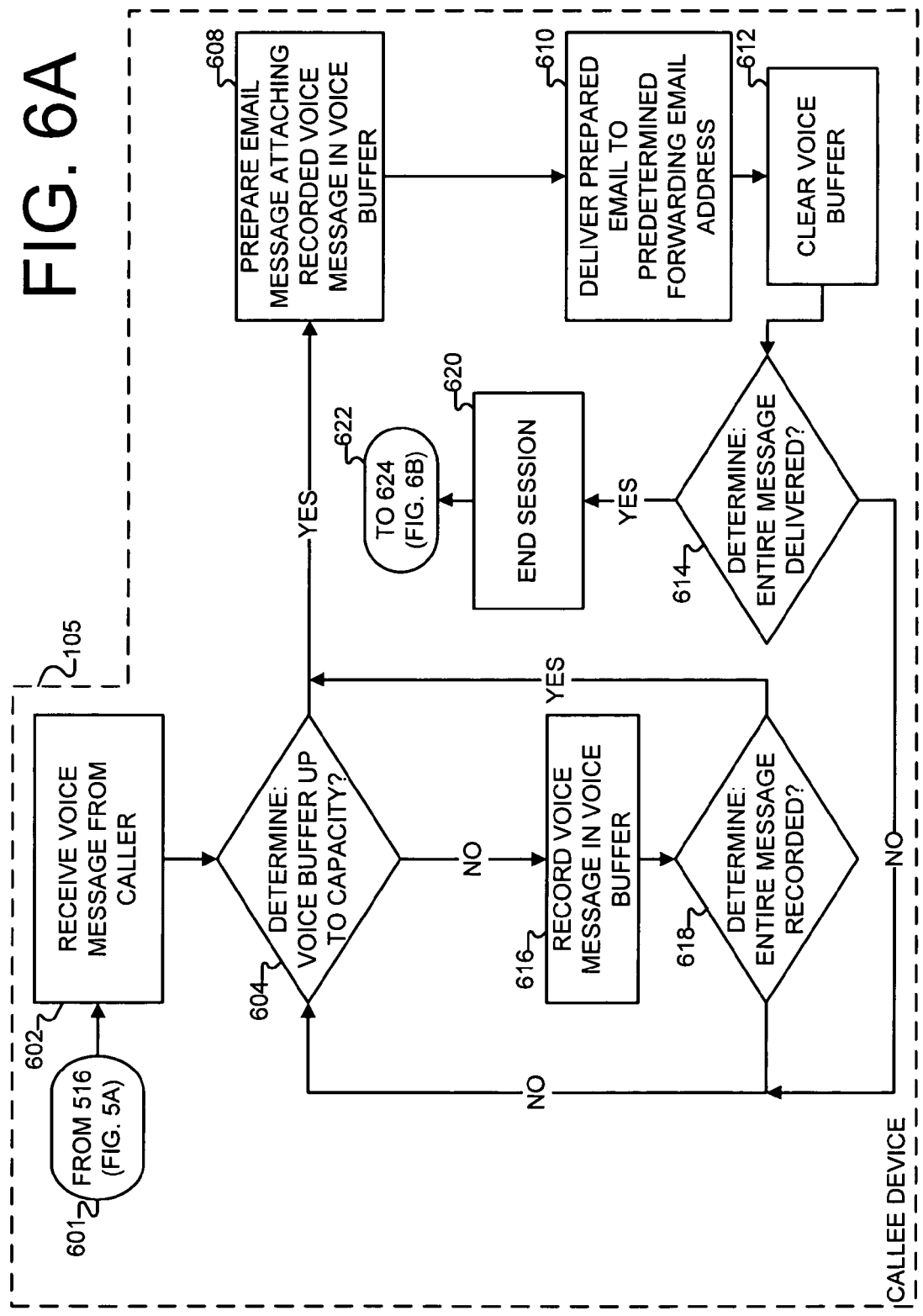

SYSTEM AND METHOD FOR FORWARDING MESSAGES

CROSS-REFERENCE TO RELATED APPLICATION

This application is a continuation of U.S. application Ser. No. 10/201,701, entitled "System and Method for Forwarding Messages," filed Jul. 23, 2002, which is entirely incorporated herein by reference.

FIELD OF INVENTION

The present invention relates generally to telecommunications, and, specifically, to a system and method for forwarding messages.

BACKGROUND

Current Internet-based real-time communications include text-based Internet messaging (e.g., instant messages, etc.) as well as Internet telephony. For text-based Internet messaging, such as, for example, instant messages, a text message that is received in a recipient's absence may be retrieved at a later time because text messages are typically present on a recipient's screen as a part of the entire text session. Thus, for example, a recipient who has temporarily stepped away from the system may be able to use a scroll bar to "scroll back" to a message that was missed while the recipient was momentarily unavailable.

In contrast to text-based Internet messaging, problems are present in Internet telephony when a user is unavailable to receive an incoming message. Since Internet telephony is akin to conventional telephony in terms of user interaction, both users (i.e., a caller and a callee) must typically be present in order to maintain real-time communications. Thus, for example, when a callee becomes temporarily unavailable, a caller must typically await the callee's return before a conversation can ensue. Normally, this does not present a problem. However, if a caller is unable to await a callee's presence and wishes to relay a voice-based message during the callee's absence, then an inconvenience is presented to the caller. Similarly, if a callee wishes to relay a voice-based message during a caller's absence, then an inconvenience is presented to the callee.

Thus, a need exists in the industry to address the potential inconvenience that arises from a user's absence in Internet telephony.

SUMMARY

Preferred embodiments of the present invention provide systems and methods for forwarding messages.

Briefly described, in architecture, one embodiment, among others, of the system comprises a voice message recorder configured to record a voice message during an established Internet telephony session, wherein the voice message recorder is further configured to record the voice message in response to an unavailability of a first party to the established Internet telephony session. The embodiment further comprises a call controller configured to attach the recorded voice message to an electronic message, wherein the call controller is further configured to forward the electronic message to a predetermined forwarding address.

Another embodiment of the present invention can also be viewed as providing a method for forwarding messages. In this regard, one embodiment, among others, of such a method can be broadly summarized as establishing an Internet telephony session, determining an unavailability of a first party during the established Internet telephony session, returning a pre-recorded voice prompt to a second party, wherein the pre-recorded voice prompt is indicative of the unavailability of the first party, receiving a voice message from the second party in response to the returned pre-recorded voice prompt, recording the received voice message, preparing an electronic message including the voice message, and delivering the prepared electronic message to a predetermined forwarding address.

Other systems, methods, features, and advantages of the present invention will be or become apparent to one with skill in the art upon examination of the following drawings and detailed description. It is intended that all such additional systems, methods, features, and advantages be included within this description, and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 6A is a flowchart showing method steps associated with message forwarding in another embodiment of the invention.

DETAILED DESCRIPTION OF THE PREFERRED EMBODIMENTS

Figure 1A:
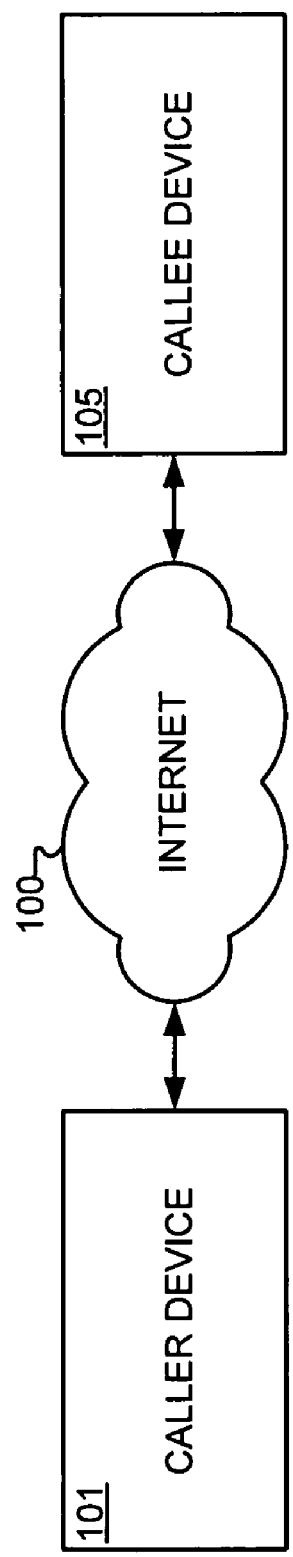
FIG. 1A is a block diagram showing one embodiment of the system having a caller device and several callee devices.

Having summarized various aspects of the present invention, reference will now be made in detail to the description of the preferred embodiments of the invention as illustrated in the drawings. While the preferred embodiments of the invention will be described in connection with these drawings, there is no intent to limit the invention to the embodiment or embodiments disclosed therein. On the contrary, the intent is to cover all alternatives, modifications, and equivalents included within the spirit and scope of the invention as defined by the appended claims.

FIG. 1A is a block diagram showing one embodiment of the invention having a caller device 101 and a callee device 105. Since the caller device 101 and the callee device 105 are configured to communicate with each other over the Internet, these devices 101, 105 may be general-purpose computers, session initiation protocol (SIP) telephones, or any programmable device configured to communicate over the Internet. For simplicity, these devices 101, 105 are simply referred to herein as either a caller device 101 or a callee device 105, depending on whether the device is initiating the Internet telephony session (caller device 101) or responding to an initiation of the Internet telephony session (callee device 105). As shown in FIG. 1A, the caller device 101 and the callee device 105 are connected to the Internet 100, thereby permitting communication between the caller device 101 and the callee devices 105 over the Internet. The callee device 105 is configured to engage in Internet telephony, which is initiated by the caller device 101. Once the Internet telephony session has been established, if a callee is unavailable to dialogue with the caller over the established session (e.g., not physically present at the callee device 105, unable to dialogue at that moment, unwilling to converse with the caller, etc.), then callee device 105 is configured to record any voice message that may be left by the caller, attach the recorded voice message to an electronic message (e.g., email, etc.), and forward the electronic message to a predetermined forwarding address. At some later time, when the callee becomes available, the callee may retrieve the electronic message and play back the attached voice message. In this sense, if the callee device 105 is a general-purpose computer engaged in Internet telephony, then the callee device 105 may be used in both the message-forwarding and message-playback capacities.

Figure 1B:
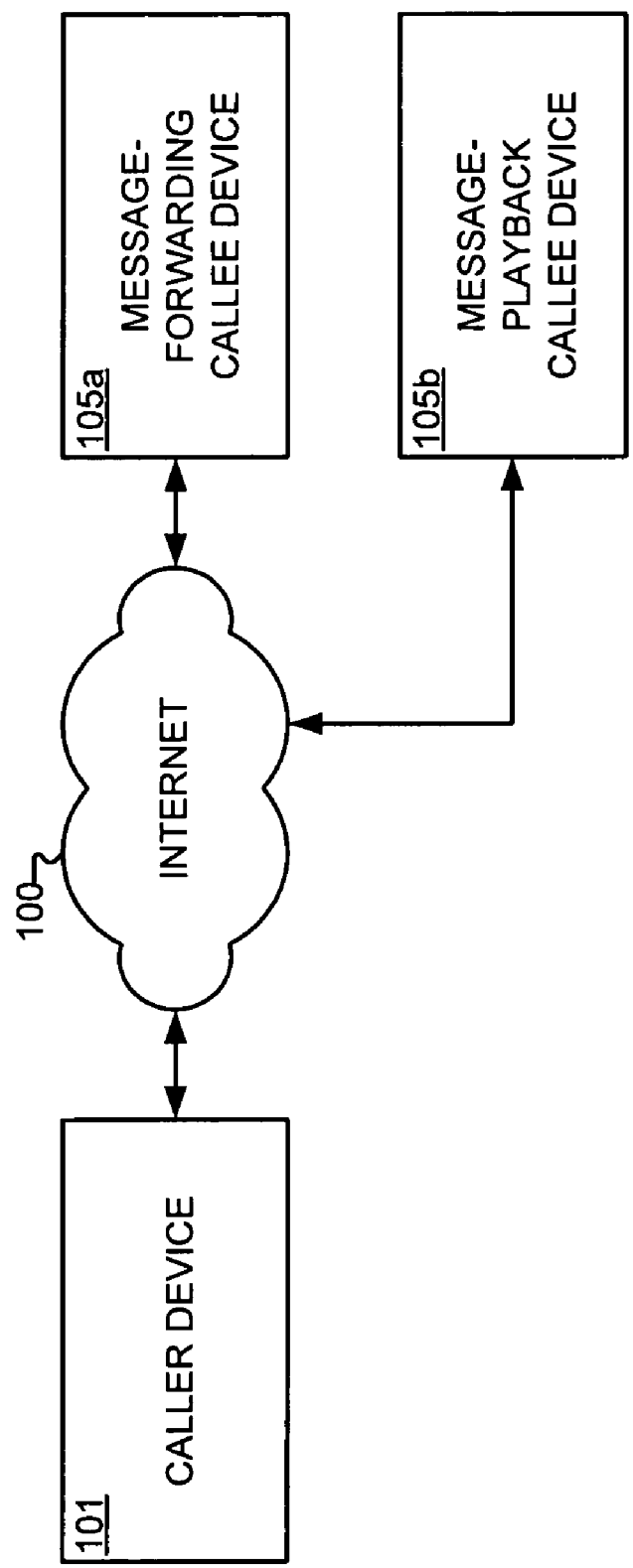
FIG. 1B is a block diagram showing another embodiment of the system having a caller device and a callee device.

FIG. 1B is a block diagram showing one embodiment of the system having a caller device 101 and several callee devices 105a, 105b. Unlike FIG. 1A, in which the message-forwarding capability and the message-playback capability are integrated into a single device 105, the message-forwarding capability and the message-playback capability may be separated such that one device 105a forwards a recorded message, while another device 105b plays back the recorded message. The separate functionality of the callee devices 105a, 105b are shown in greater detail in FIGS. 2A and 2B.

Figure 2A:
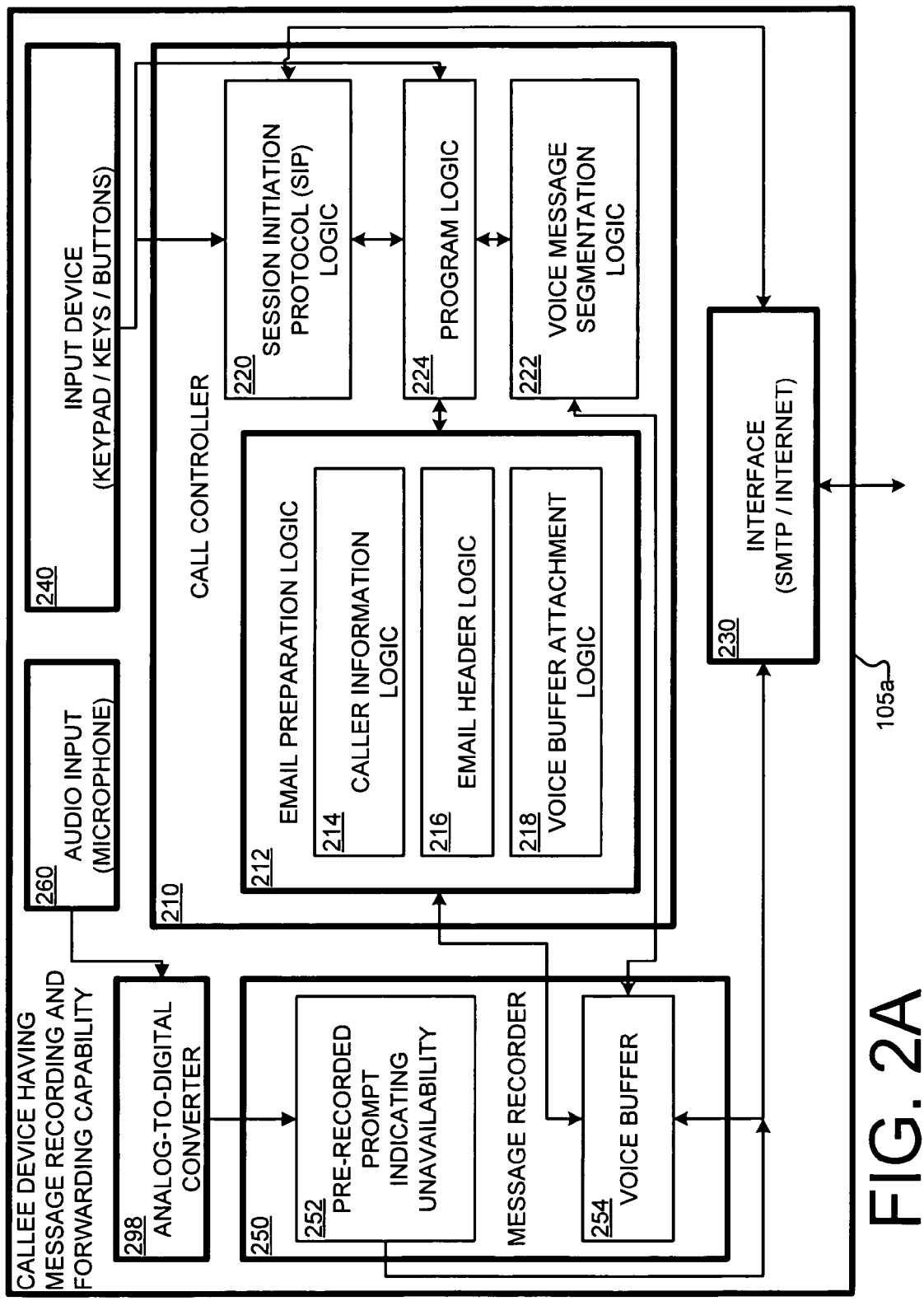
FIG. 2A is a block diagram showing, in greater detail, the message-forwarding callee device of FIG. 1A.
Figure 2B:
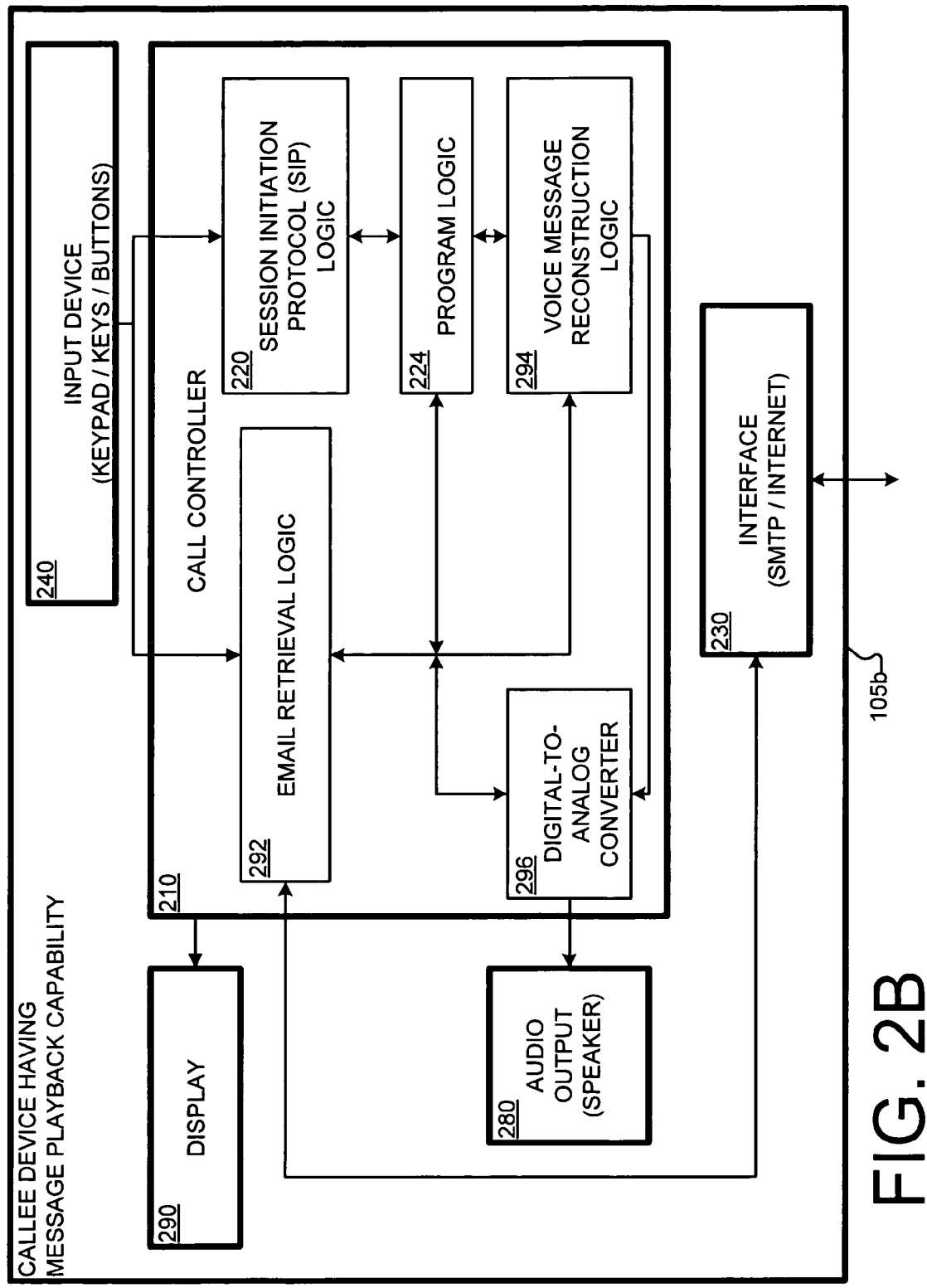
FIG. 2B is a block diagram showing, in greater detail, the message-playback callee device of FIG. 1A.

FIGS. 2A and 2B are block diagrams showing embodiments of devices having message recording, forwarding, retrieving, and playback capabilities. In a preferred embodiment, the devices may be general-purpose computers having speakers, microphones, and dedicated hardware for converting analog voice signals into digital sound recordings, and vice versa. In another embodiment, the devices may be SIP telephones having dedicated hardware and software configured to record and forward messages. Additionally, the message-forwarding callee device 105a and the message-playback callee device 105b may be implemented as separate devices (see FIG. 1B), or, in the alternative, may be implemented as a single device (see FIG. 1A). Thus, in one embodiment, the callee device 105 may be configured to have only message recording and forwarding capabilities, while in another embodiment, the callee device 105 may be configured to have only message retrieval and playback capabilities. Alternatively, the same callee device 105 may be configured to have message recording, forwarding, retrieval, and playback capabilities. For purposes of illustration, separate message forwarding and playback devices are shown in the embodiments of FIGS. 2A and 2B.

FIG. 2A is a block diagram showing components in a message-forwarding callee device 105a. As such, the callee device 105 comprises an audio input (e.g., microphone) 260, an input device 240 (e.g., keypad, keys, buttons, etc.), an analog-to-digital (A/D) converter 298, a call controller 210, a message recorder 250, and an interface 230 (e.g., Internet interface). The audio input 260 is configured to receive an audio message that is indicative of the unavailability of the callee. As such, the audio input receives an analog audio message from the callee, which indicates that the callee is not available. The analog audio message is converted to a digital message using the A/D converter 298 and stored in the message recorder 250. The stored message is a pre-recorded voice prompt 252, which later indicates the unavailability of the callee to the caller when an Internet telephony session is established between the caller and the callee. In this sense, the pre-recorded voice prompt 252 is stored at the callee device 105, rather than at a remote site as in other known voice mail systems.

In a broad sense, the interface 230 interfaces the callee device 105 to the Internet or to any other system capable of real-time transmission and reception of voice messages. Additionally, if the interface 230 is configured as an Internet interface, it may also serve as an interface for email communications (e.g., simple mail transfer protocol (SMTP), etc.). The interface 230 is configured to provide a connection to a caller, thereby relaying the pre-recorded voice prompt 252 to the caller as well as receiving a voice message from the caller. The received voice message from the caller is stored in the message recorder 250. In this sense, the message recorder 250 may be seen as comprising a voice buffer 254, which stores the incoming voice message. Since the voice message is received over the interface 230 from, for example, the Internet, the voice message is already in digital format. Thus, the received voice message may be stored by the voice buffer 254 without modification.

If the callee device 105 is a computer, then the input device 240 may be a computer keyboard configured to receive user input. In one embodiment, the input device 240 may be used by a callee to retrieve email messages having attached voice messages. In another embodiment, the input device 240 may be used to enter information on whether or not the callee is available (e.g., programming the call controller 210 to either enable or disable the recording and forwarding of messages, etc.). Furthermore, the input device 240 may be used by the callee to enter a predetermined email address to which the recorded voice messages should be sent.

The call controller 210 controls the operation of the callee device 105. Thus, in one embodiment, the call controller 210 is configured to attach the stored voice message to an email message and transmit the email message to the predetermined email address. In this sense, the call controller 210, in one embodiment, comprises session initiation protocol (SIP) logic 230 or other logic adapted to enable the callee device 105 for Internet telephony. Additionally, the call controller 210 includes email preparation logic 212, which prepares an email message having an attached voice message. In this sense, the email preparation logic 212 may be seen as comprising caller information logic 214, which determines caller information, such as the name of the caller and the destination (e.g., phone number of the caller, Internet protocol (IP) address of the caller, universal resource identifier (URI) of the caller, etc.). Since the determination of a caller's IP address and URI are described in detail in RFC 2543 (Session Initiation Protocol), further discussion of this aspect of the call controller 210 are omitted here.

The email preparation logic 212 may further include email header logic 216, which generates an email header for the prepared email message. Also, since the voice message is attached to the email message, the email preparation logic 212 may also include voice buffer attachment logic 218, which attaches the voice message from the voice buffer to the prepared email message. The email preparation logic 212 also confirms the validity of the predetermined email address. In this sense, when the callee device 105 is first programmed, the email preparation logic 212 prepares a test email message and transmits it to the address to confirm proper delivery of the email message. The call controller 210 may also be configured to notify the caller of the remaining time for recording a voice message. Also, as discussed above, the call controller 210 may also be programmed to determine circumstances when the callee may be considered unavailable. For example, the callee may program the call controller 210 to indicate a callee's unavailability when the callee is physically not present at the callee device 105. Similarly, the callee's unavailability may be defined by a time of day (e.g., office hours, etc.), day of the week (e.g., weekends, etc.), or simply whenever the callee chooses not to answer the call within a finite time span (e.g., a finite number of rings on a SIP phone, etc.). In order to accommodate these various conditions, the call controller 210 also comprises program logic 224, which stores and controls the programmable features of the callee device 105.

In one example, among many, of the operation of the callee device 105, the callee device 105 receives an incoming SIP call through the interface 230. The SIP call is directed to the call controller 210, which enables the SIP logic 230 to establish a session between the callee device 105 and the caller device 101 (FIG. 1A). If the callee device 105 determines that the callee is not available, then the call controller 210 retrieves the pre-recorded voice prompt 252 from the message recorder 250 and relays the pre-recorded voice prompt 252 to the caller device 101 (FIG. 1A) through the interface 230. When the caller receives the pre-recorded voice prompt 252 at the caller device 101 (FIG. 1A) and listens to the pre-recorded voice prompt 252, the caller then transmits a voice message to the callee device 105 using the caller device 101 (FIG. 1A). The callee device 105 records the voice message in the voice buffer 254. Once the call controller 210 determines that the voice message has been recorded, the email preparation logic 212 of the call controller 210 prepares an email message having the recorded voice message attached to the email message. In doing so, the caller information logic 214 determines information about the caller (e.g., name, SIP URI, etc.), and the email header logic 216 includes this information in a header of the email message. Once this is done, the voice buffer attachment logic 218 retrieves the recorded voice message and attaches the voice message to the email message. The call controller 210 then transmits the prepared email message.

In another example of the operation of the callee device 105, the callee device 105 receives an incoming SIP call through the interface 230. The SIP call is directed to the call controller 210, which enables the SIP logic 220 to establish a session between the callee device 105 and the caller device 101 (FIG. 1A). If the callee device 105 determines that the callee is not available, then the call controller 210 retrieves the pre-recorded voice prompt 252 from the message recorder 250 and relays the pre-recorded voice prompt 252 to the caller at the caller device 101 (FIG. 1A) through the interface 230. Upon receiving and playing the pre-recorded voice prompt 252, the caller, using the caller device 101 (FIG. 1A), transmits a voice message to the callee device 105, which records a voice message in the voice buffer 254. In this embodiment, if the message exceeds the capacity of the voice buffer 254 (e.g., exceeds a predetermined threshold capacity), then the voice message segmentation logic 222 of the call controller 210 divides the voice message into multiple segments. Once the call controller 210 determines that one segment of the voice message has been recorded, the email preparation logic 212 of the call controller 210 prepares an email message having the segment of the recorded voice message attached to the email message. In doing so, the caller information logic 214 determines information about the caller (e.g., name, SIP URI, etc.), and the email header logic 216 includes this information in a header of the email message. Once this is done, the voice buffer attachment logic 218 retrieves the segment of the voice message from the voice buffer and attaches the segment of the voice message to the email message. The call controller 210 then transmits the prepared email message. Thus, each segment of the voice message is recursively recorded and transmitted until the entire message has been recorded and transmitted.

FIG. 2B is a block diagram showing components of a message-playback callee device 105b. In this sense, the callee device 105 comprises a display 290, an input device 240 (e.g., keypad, keys, buttons, etc.), a digital-to-analog (D/A) converter 298, a call controller 210, and an interface 230 (e.g., Internet interface).

Similar to FIG. 2A, the interface 230 of FIG. 2B interfaces the callee device 105 to the Internet, or to any other system capable of real-time transmission and reception of voice messages. Additionally, if the interface 230 is configured as an Internet interface, it may also serve as an interface for email communications (e.g., simple mail transfer protocol (SMTP), etc.). In a preferred embodiment, the interface 230 is configured to provide a connection to an email server, thereby permitting retrieval of email by the callee device 105 via the interface 230. If the callee device 105 is a computer, as in a preferred embodiment, then the input device 240 may be a computer keyboard configured to receive user input. In one embodiment, the input device 240 may be used by a callee to retrieve email messages having attached voice messages. The call controller 210 controls the operation of the callee device 105. In this sense, the call controller 210 comprises email retrieval logic 292, which retrieves an email message having an attached voice message. Additionally, the call controller 210 comprises voice message reconstruction logic 294, which reconstructs segmented voice messages.

In one embodiment, the callee, through the input device (e.g., computer keyboard), directs the callee device 105 to check whether or not there are any emails having attached voice messages. In response to the input by the callee, the call controller 210 determines whether or not there is an email having an attached voice message for the callee on an email server. If it is determined that there is an email having an attached voice message on the email server, then the email retrieval logic 292 requests the email message from the email server. The email server sends the email having the attached voice message to the callee device 105 in response to the request. The email message is received through the interface 230 by the email retrieval logic 292. Once the email message is retrieved by the email retrieval logic 292 in the call controller 210, the retrieved email message is displayed for the callee on the display 290. The callee, using the input device 240, may direct the call controller 210 to open the attached voice message. In response to the direction by the callee, the call controller 210 opens the attached voice message and converts the voice message to an analog audio signal using the D/A converter 296. The analog signal is then output through the audio output (e.g., speaker) 280 to the callee, thereby permitting the callee to listen to the recorded message. Since retrieval of email messages having voice attachments are well known in the art, further discussion of email retrieval is omitted here. Furthermore, since playback of sound file attachments in email messages is well known, further discussion of sound file attachments are omitted here.

In another embodiment, the callee device 105 detects a received email and notifies the callee of the received email. This may be done using an audio indication, such as playback of a specialized tone, or a video indication, such as a pop-up window on the callee's display 290. The callee, through the input device (e.g., computer keyboard), directs the callee device 105 to retrieve the email. The email retrieval logic 292 in the call controller 210 determines whether there are multiple email messages having segments of recorded voice messages, or whether there is only one email message having an attached voice message.

If the call controller 210 determines that there is only one email message having an attached voice message, then the email retrieval logic 292 retrieves the email message through the interface 230. Once the email message is retrieved by the email retrieval logic 292 in the call controller 210, the retrieved email message is displayed for the callee on the display 290. The callee, using the input device 240, directs the call controller 210 to open the attached voice message. The call controller 210 opens the attached voice message and converts the voice message to an analog audio signal using the D/A converter 296. The analog audio signal is then output through the audio output (e.g., speaker) 280 to the callee, thereby permitting the callee to listen to the recorded message. Since retrieval of email messages having voice attachments are well known in the art, further discussion of email retrieval is omitted here. Furthermore, since playback of sound file attachments in email messages is well known, further discussion of sound file attachments are omitted here.

If, on the other hand, the call controller 210 determines that there are multiple email messages having segments of recorded voice messages, then the email retrieval logic 292 retrieves the multiple email message through the interface 230. Once the multiple email messages are retrieved by the email retrieval logic 292 in the call controller 210, voice message reconstruction logic 294 reconstructs the voice message from the multiple retrieved emails. In the simplest embodiment, each of the attached segments is concatenated together to form the reconstructed voice message. Since data reconstruction is well known in the art, further discussion of the voice message reconstruction is omitted here. Once the voice message has been reconstructed, the call controller 210 generates a display for the callee to listen, save, or delete the voice message. If the callee, using the input device 240, directs the call controller 210 to open the attached voice message, then the call controller 210 opens the attached voice message and converts the voice message to an analog audio signal using the D/A converter 296. The analog audio signal is then output through the audio output (e.g., speaker) 280 to the callee, thereby permitting the callee to listen to the recorded message. Since retrieval of email messages having voice attachments are well known in the art, further discussion of email retrieval is omitted here. Furthermore, since playback of sound file attachments in email messages is well known, further discussion of sound file attachments are omitted here.

The preferred embodiments of the devices in FIGS. 2A and 2B are general-purpose computers. Thus, appropriate hardware and software may be implemented in the devices of FIGS. 2A and 2B to permit message recording, forwarding, retrieval, and playback. Having described, in detail, several embodiments of a system for recording and forwarding messages, attention is turned to FIGS. 3A through 6B, which describe several embodiments of a method that may be implemented in the system of FIGS. 2A and 2B.

Figure 3A:
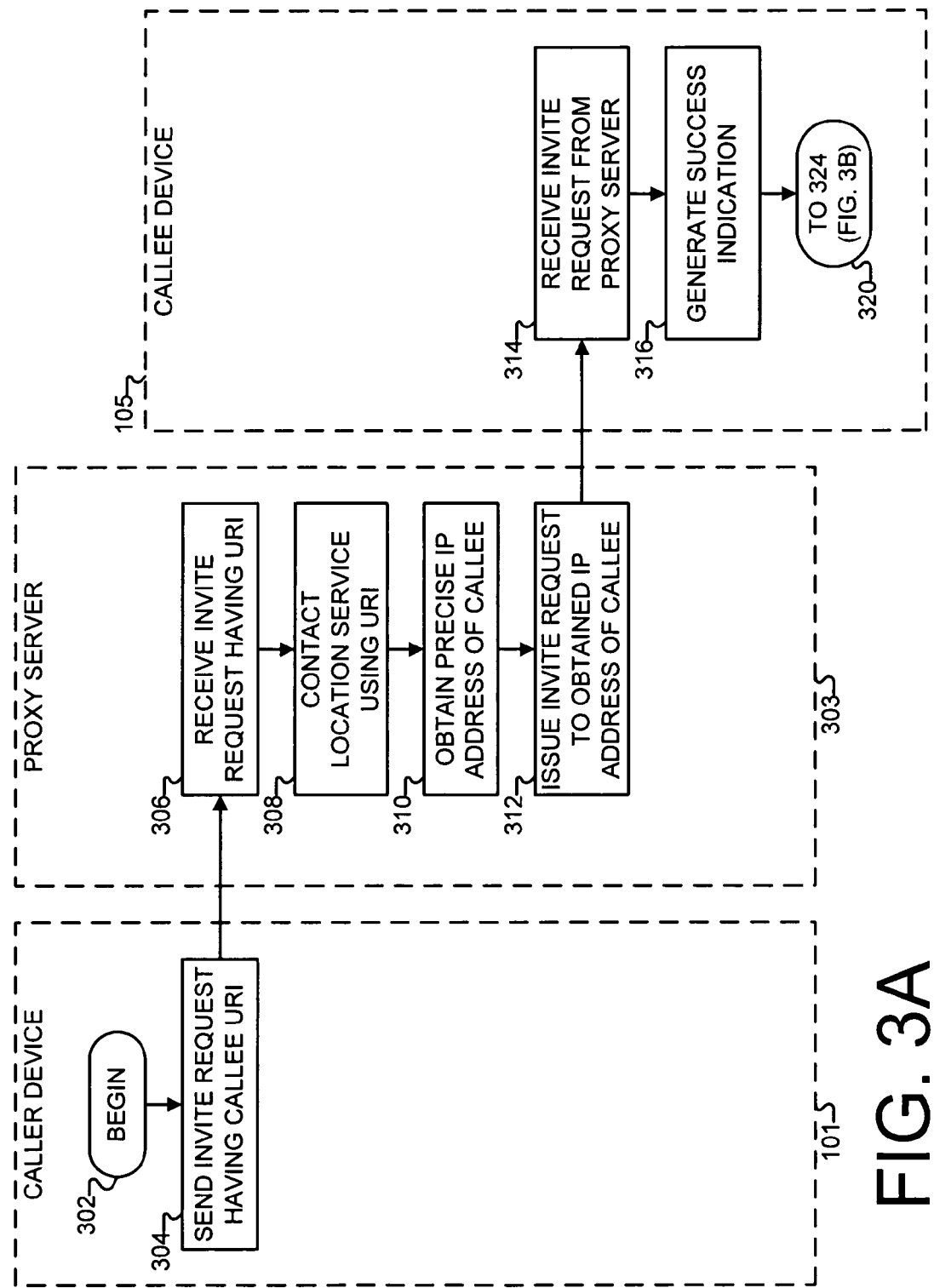
FIGS. 3A and 3B are flowcharts showing method steps associated with establishing a session between a caller and a callee in one embodiment of the invention.
Figure 3B:
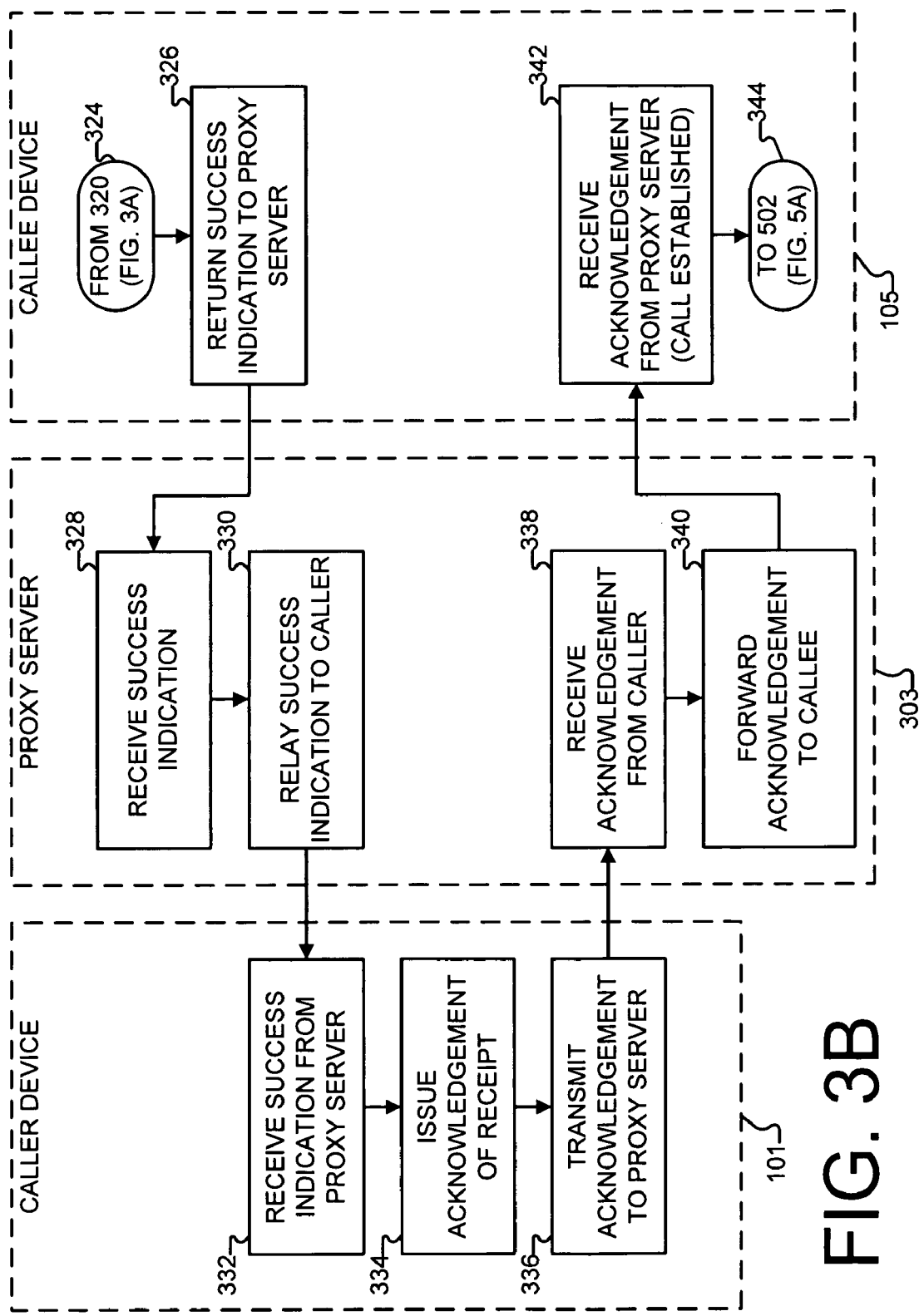

FIGS. 3A and 3B are flowcharts showing method steps associated with an Internet telephony system. Specifically, FIGS. 3A through 3B show an example process associated with session initiation protocol (SIP), wherein a session is established between a caller device 101 and a callee device 105 using a proxy server 303. Since SIP is described in detail in RFC 2543, which is incorporated by reference in its entirety, only a cursory description of SIP is presented with reference to FIGS. 3A and 3B. Furthermore, it will be clear to one of ordinary skill in the art that, in different embodiments, the caller device 101 and the callee device 105 may be SIP telephones, personal computers (PC) having a microphone and a speaker, or any number of programmable devices amenable to Internet telephony.

In the specific example of FIG. 3A, initiation of a SIP session begins, in step 302, when a caller device 101 sends, in step 304, an invite request having a universal resource identifier (URI) of a callee. The sent 304 invite request is received, in step 306, at a proxy server 303, which then contacts, in step 308, a location service (not shown) using the received 306 URI. The proxy server 303 then obtains, in step 310, a precise Internet protocol (IP) address of the callee using the received 306 URI. The precise IP address is generally associated with the callee device 105 at which the callee is "logged on." An invite request is subsequently issued, in step 312, by the proxy server 303 to the obtained 310 IP address of the callee device 105. The callee device 105 receives, in step 314, the invite request from the proxy server 303, and subsequently generates, in step 316, a success indication to signal that an invitation was successfully received at the callee device 105.

Once the callee device 105 generates 316 the success indication, the process continues in FIG. 3B, with the callee device 105 returning, in step 326, the generated 316 success indication to the proxy server 303. The proxy server 303 receives, in step 328, the returned 326 success indication from the callee device 105, and relays, in step 330, the success indication to the caller device 101. The relayed 330 success indication is received, in step 332, by the caller device 101, which issues, in step 334, an acknowledgement of the receipt of the success indication. This issued 334 acknowledgement is transmitted, in step 336, to the proxy server 303 by the caller device 101. The proxy server 303 receives, in step 338, the acknowledgement from the caller device 101, and forwards, in step 340, the acknowledgement to the callee device 105. The callee device 105 receives, in step 342, the forwarded 340 acknowledgement from the proxy server 303, which completes the established call between the caller device 101 and the callee device 105.

At this point, the caller and the callee may freely exchange voice-based Internet messages over the established Internet telephony session (i.e., SIP session). In other words, at this point, the caller and the callee are able to converse freely over the Internet. However, in previous systems, if the callee was not available (e.g., unwilling to accept the call from the caller, physically not present, etc.) at the callee device 105 when the session was established, the caller typically had no recourse but to end the session, since there was no callee with whom the caller may talk. Alternatively, the caller may have waited for the callee's availability, which may have been an indefinite amount of time. Unlike previous systems, the several embodiments shown in FIGS. 5A through 6B address this problem.

Figure 4A:
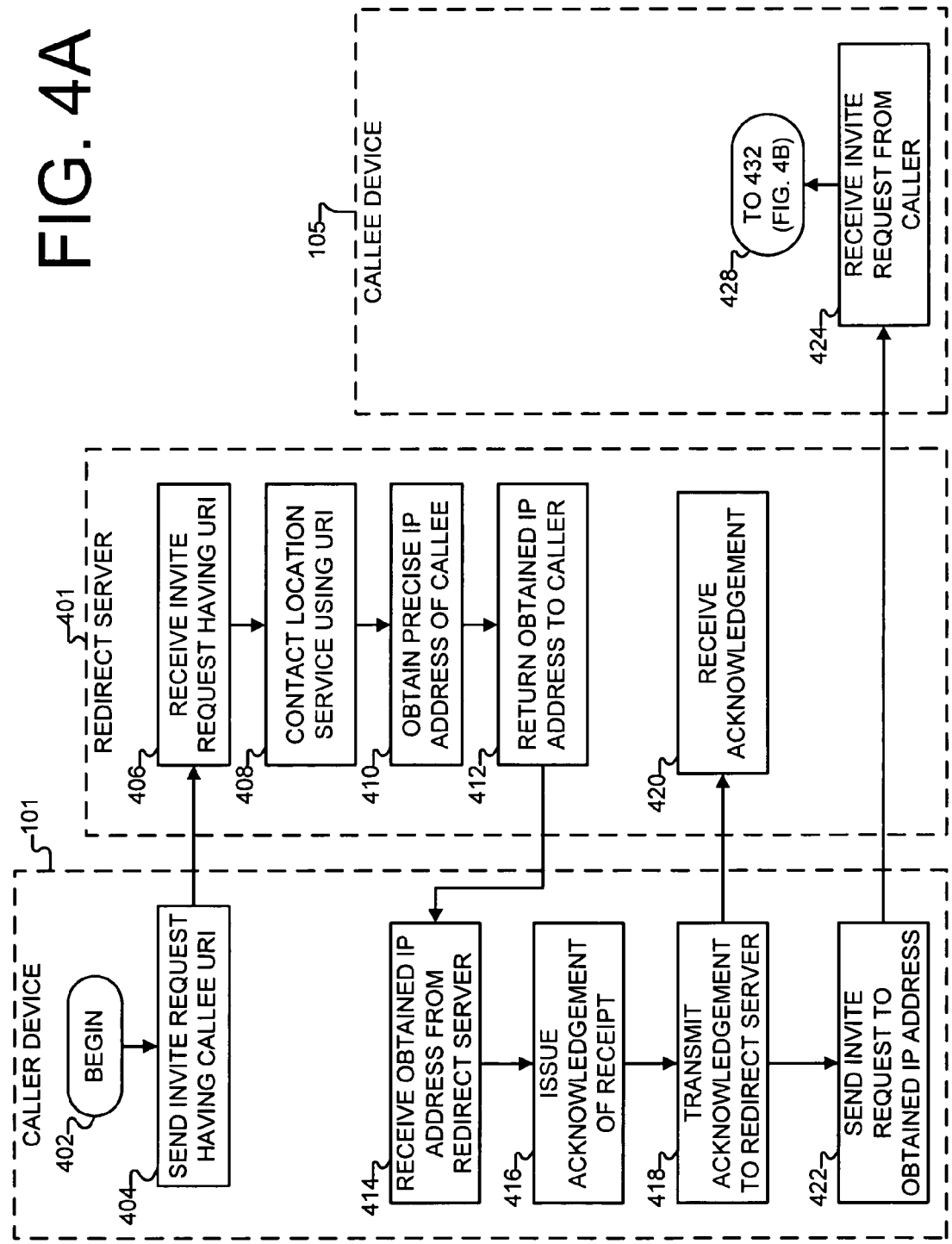
FIGS. 4A and 4B are flowcharts showing method steps associated with establishing a session between a caller and a callee in another embodiment of the invention.
Figure 4B:
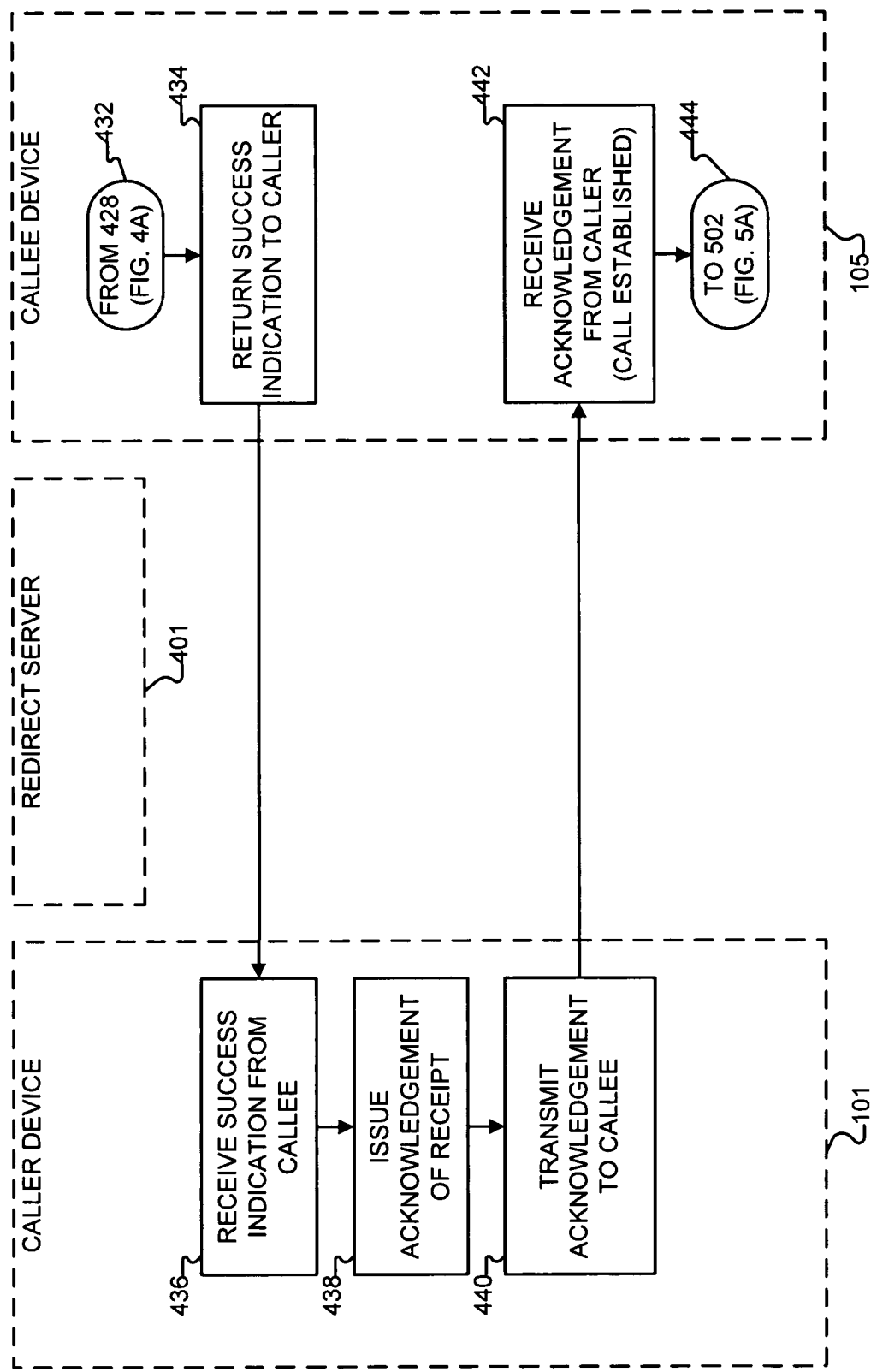

FIGS. 4A through 4B are flowcharts showing method steps for another Internet telephony system, which uses SIP. Since SIP is described in detail in RFC 2543, only a cursory description of SIP is presented with reference to FIGS. 4A and 4B. Furthermore, it will be clear to one of ordinary skill in the art that, in different embodiments, the caller device 101 and the callee device 105 may be SIP telephones, personal computers (PC) having a microphone and a speaker, or any number of programmable devices amenable to Internet telephony.

In the specific example of FIG. 4A, initiation of a SIP session begins, in step 402, when a caller device 101 sends, in step 404, an invite request having a URI of a callee. The sent 404 invite request is received, in step 406, at a redirect server 401, rather than a proxy server 203 (FIGS. 3A and 3B). The redirect server 401 then contacts, in step 408, a location service (not shown) using the received 406 URI. The redirect server 401 subsequently obtains, in step 410, a precise Internet protocol (IP) address of a callee device 105, which is returned, in step 412, to the caller device 101. The caller device 101 receives, in step 414, the obtained IP address of the callee device 105 from the redirect server 401, and issues, in step 416, an acknowledgement of receipt for the received 414 IP address. The issued 416 acknowledgement is transmitted, in step 418, to the redirect server 401, which receives, in step 420, the acknowledgement from the caller device 101. In addition to transmitting 418 the acknowledgement to the redirect server 401, the caller device 101 also sends, in step 422, an invite request to the obtained IP address of the callee device 105. The callee device 105 receives, in step 424, the invite request from the caller device 101.

Once the callee device 105 receives 424 the invite request from the caller device 101, the process continues in FIG. 4B with the callee device 105 returning, in step 434, a success indication directly to the caller device 101. The caller device 101 receives, in step 436, the success indication from the callee device 105, and issues, in step 438, an acknowledgement of the receipt of the success indication. The issued 438 acknowledgement is transmitted, in step 440, to the callee device 105, which receives, in step 442, the acknowledgement from the callee device 105. At this point, a session is initiated between the caller and the callee. Thus, similar to FIGS. 3A through 3B, the caller and the callee may again freely exchange voice-based Internet messages. However, in previous systems, if the callee was not available (e.g., physically not present, unwilling to dialogue with the caller, unable to talk with the caller at that moment, etc.) at the callee device 105 when the session was established, the caller again had no recourse but to end the session or wait for the callee's availability. Unlike previous systems, the several embodiments shown in FIGS. 5A through 6B address this deficiency.

Figure 5A:
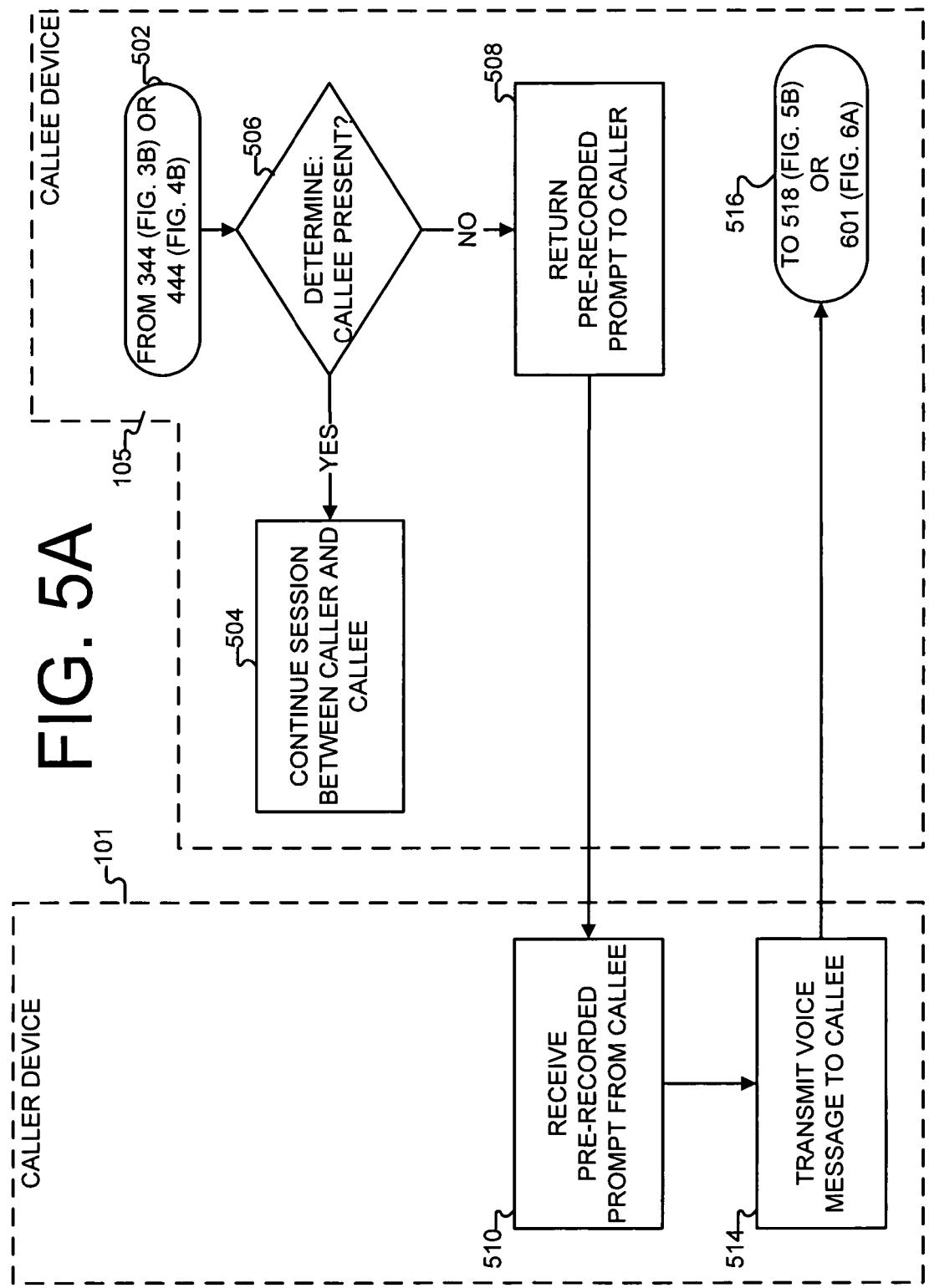
FIGS. 5A-5C are flowcharts showing method steps associated with message forwarding in one embodiment of the invention.

FIGS. 5A through 5D are flowcharts showing method steps in one embodiment of an Internet telephony system having message recording and forwarding capabilities. As shown in FIG. 5A, the method steps continue in step 502 from the end of the initiation process (i.e., from step 344 of FIG. 3B or 444 of 4B). At this point, a session has been established between a caller device 101 and a callee device 105. The callee device 105 may be a SIP telephone, a personal computer having a microphone and a speaker, or any number of programmable devices amenable to Internet telephony.

As shown in FIG. 5A, the callee device 105, upon having established a session, determines, in step 506, whether or not a callee is present (e.g., available to take the call, willing to take the call, physically present at the callee device 105, etc.). If the callee device 105 determines 506 that the callee is present, then the session between the caller and the callee continues, as shown in step 504. If, on the other hand, the callee device 105 determines 506 that the callee is not available (e.g., unable to receive the call from the caller at that moment, physically not present, unwilling to dialogue with the caller at that moment, etc.), then the callee device 105 returns, in step 508, a pre-recorded voice prompt to the caller device 101. Regardless of the reason for the callee's unavailability, the callee device 105, as discussed with reference to FIG. 4A, may be programmed to account for many different circumstances. Once the callee's availability (or unavailability) has been determined, the caller device 101 receives, in step 510, the pre-recorded voice prompt from the callee device 105. The pre-recorded voice prompt is played to the caller at the caller device 101, at which point the caller transmits, in step 514, a voice message from the caller device 101 to the callee device 105 using the established session. Alternatively, the caller may choose to terminate the session without transmitting a voice message to the unavailable callee.

Figure 5B:
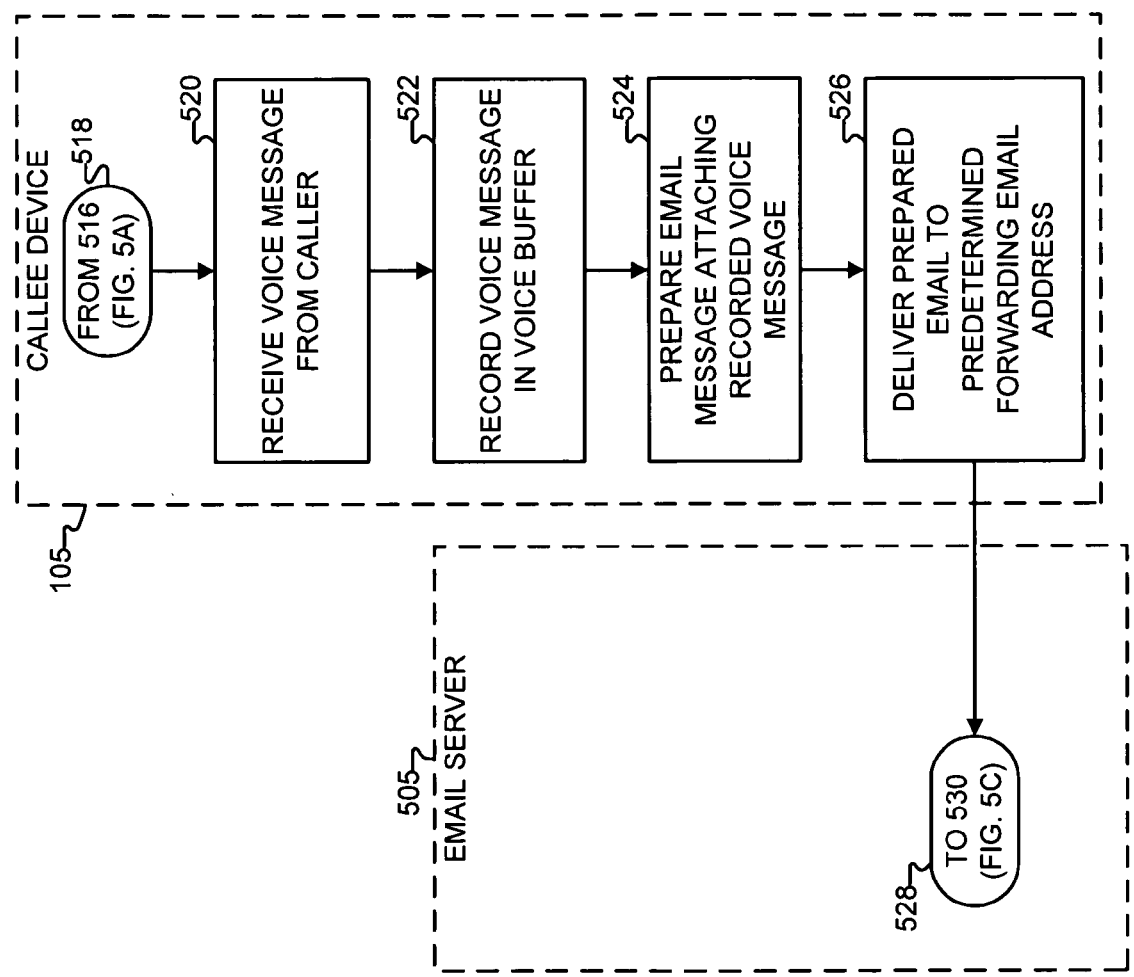

If the caller transmits 514 the voice message to the callee device 105, the process continues in FIG. 5B, wherein the callee device 105 receives, in step 520, the voice message from the caller. The received 520 voice message is recorded, in step 522, into a voice buffer. Thus, unlike conventional voicemail systems, which record voice messages at a remote location from the callee, the callee device 105 here records voice messages at the callee device 105. Once the message has been recorded 522, an electronic message is prepared, in step 524, wherein the recorded 522 voice message is attached to the electronic message as a recording in an MP3 format, a WAV format, or any other type of digital-audio format. Since, in a preferred embodiment, the electronic message is an email message that may be transmitted and received using a simple mail transfer protocol (SMTP), the following embodiments are described with reference to email messages, although other types of electronic messages may also be used.

Continuing, the prepared 524 email is then delivered, in step 526, to a predetermined forwarding address, which has been previously entered by the callee. In one embodiment, the predetermined address may be entered by the callee using a callee device 105 as described in FIG. 2A. After delivery 526 of the email to the predetermined forwarding address, the process continues in FIG. 5C, wherein a email server 505 receives, in step 532, the email from the callee device 105, and transmits, in step 534, a confirmation of the email receipt to the callee device 105. The callee device 105 receives, in step 536, the confirmation from the email server 505. Upon receiving 536 the confirmation, the callee device 105 clears, in step 538, the voice buffer, which places the callee device 105 in condition for another message from another caller. In this sense, if the email is properly transmitted 534 and the voice buffer cleared 538, then the voice messages are stored, along with an email message, separately from the callee device 105. This allows for greater storage capacity at the callee device 105, as compared to conventional digital answering machines that store multiple voice messages. Also, since the recording of the voice mail message occurs at the callee device 105, there is no need for a separate voice mail server as there is in conventional voice mail systems.

Figure 5C:
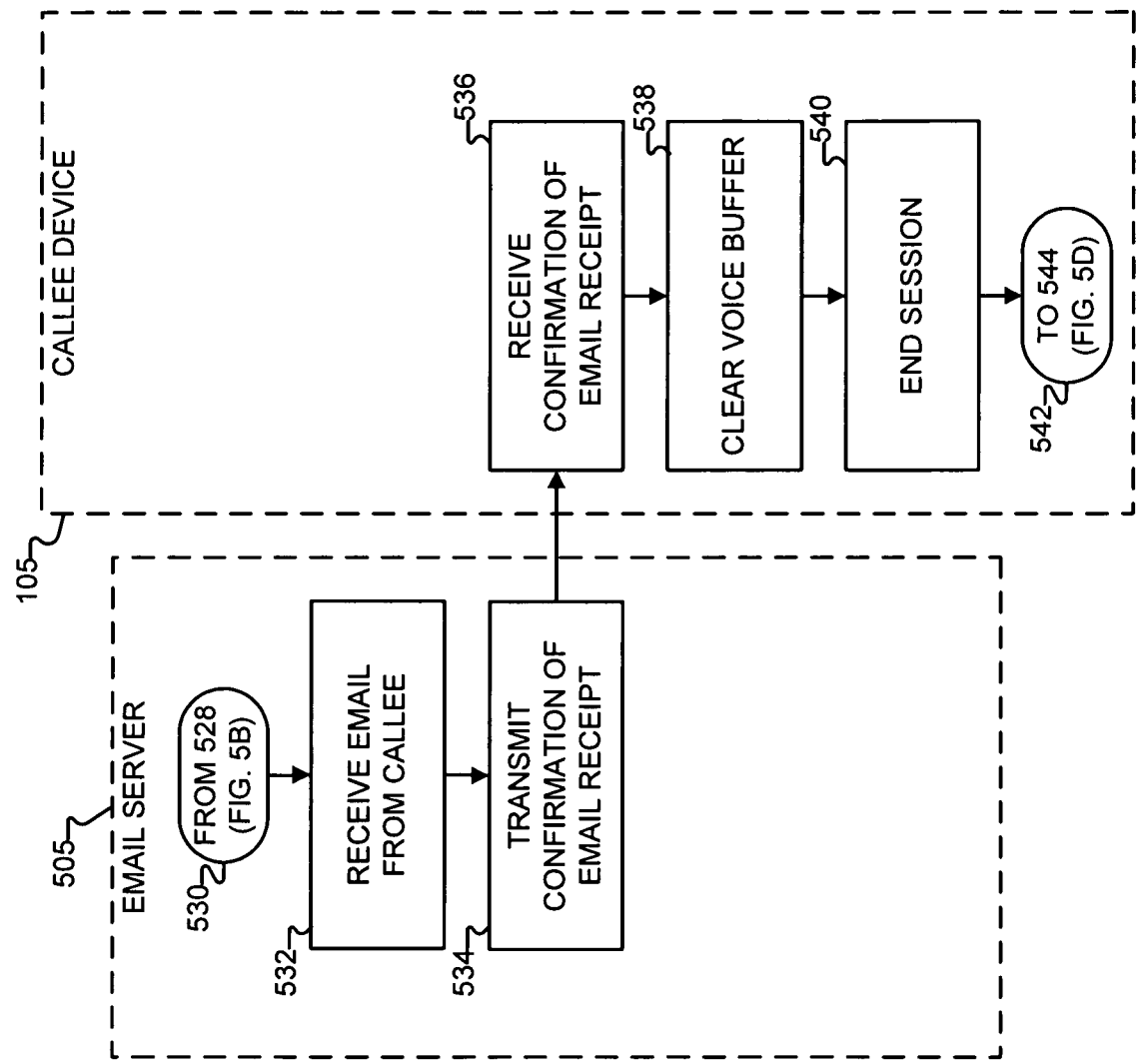

In the absence of a delivery confirmation (e.g., forwarding address is problematic), the callee device 105 may also be configured to locally store the recorded voice message. In this sense, if the message is undeliverable to the predetermined forwarding address, then the callee device 105 may emulate a digital answering machine. Thus, added flexibility is included into the callee device 105. In any event, as shown in FIG. 5C, the session then ends in step 540 upon confirmation receipt by the callee device 105.

Figure 5D:
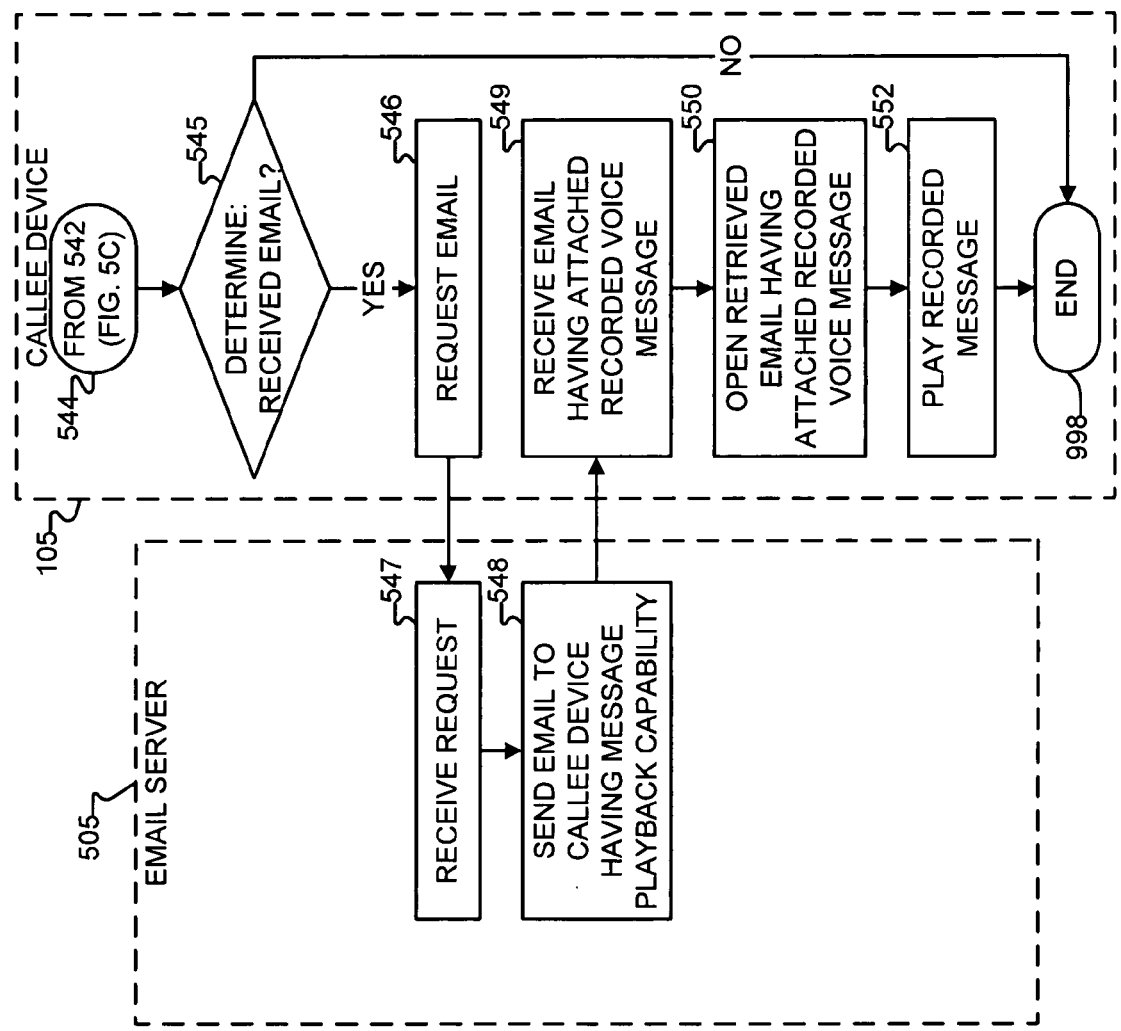
FIG. 5D is a flowchart showing method steps associated with message playback in one embodiment of the invention.

At some later time, the callee may retrieve the voice message for playback. While a specific email retrieval process is shown in FIG. 5D, it will be clear to one of ordinary skill in the art that retrieval of email messages and opening of attachments is well known in the art. Hence, any known method for retrieving and opening email attachments may be employed.

When the callee becomes available, the callee checks the callee device 105, which determines, in step 545, whether or not there is any received email for the callee. If it is determined 545 that there is no email, then the process ends, in step 998. If, on the other hand, it is determined 545 that there is email for the callee, then the callee device 105 requests, in step 546, the email, which includes the attached voice message from the caller. The email server 505 receives, in step 547, the request for the email, and sends, in step 548, the email having the voice message to the callee device 105. The callee device 105 receives, in step 549, the email having the voice message. The received 549 email is opened, in step 550, by the callee device 105, and the voice message is played, in step 552, to the callee who is now available to hear the message from the caller. The process ends, in step 998, upon playback of the recorded message by the callee.

As shown in FIGS. 5A through 5D, this embodiment of the method permits a caller to leave a voice message for a callee even though the callee may not be available during the established session. Thus, the caller is no longer required to wait for the availability of the callee, and, also, permits the callee to receive potentially important messages that may not have been received without the call recording, forwarding, retrieval, and playback method as shown in FIGS. 5A through 5D.

Figure 6B:
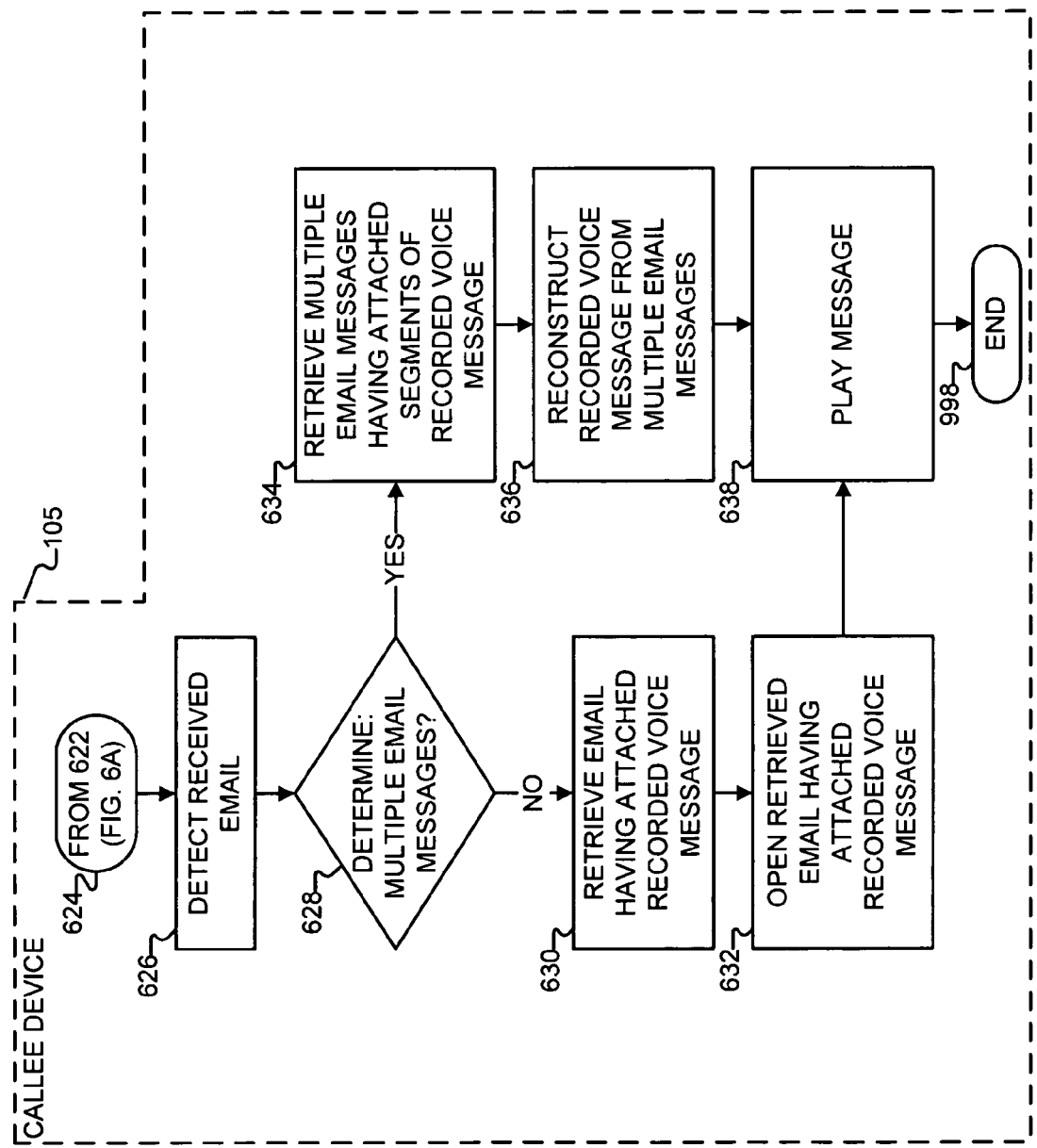
FIG. 6B is a flowchart showing method steps associated with message playback in another embodiment of the invention.

FIGS. 6A through 6B are flowcharts showing method steps in another embodiment of an Internet telephony system having message recording and forwarding capabilities. In this embodiment of the method, the callee device 105 is configured to segment messages such that long messages will not be prematurely truncated. In this sense, the embodiment of the method in FIGS. 6A and 6B continue from the transmission 516 (FIG. 5A) of the voice message by the caller. As shown in FIG. 6A, the callee device 105 receives, in step 602, a voice message from the caller device 101. Upon receiving 602 the voice message, the callee device 105 determines, in step 604, whether or not the voice buffer is filled to capacity. In other words, the callee device 105 determines 604 whether there is available memory to continue recording the voice message. In one embodiment, a voice buffer that is ninety (90) percent full may be viewed as being filled to capacity. In another embodiment, a voice buffer that is eighty (80) percent full may be viewed as being filled to capacity. Regardless of the specific percent value, it is sufficient to note that a predetermined threshold capacity may be used to determine when the voice buffer is filled to capacity.

If the callee device 105 determines 604 that the voice buffer is not filled to capacity, then the callee device 105 records, in step 616, the voice message in the voice buffer. If, on the other hand, the callee device 105 determines 604 that the voice buffer is filled to capacity, then the callee device 105 prepares, in step 608, an email and attaches the recorded voice message from the voice buffer to the prepared 608 email. The prepared 608 email is delivered, in step 610, to a predetermined forwarding address, and the voice buffer is subsequently cleared in step 612.

Upon clearing the voice buffer, the callee device 105 determines, in step 614, whether or not the entire message has been recorded and delivered. If the callee device 105 determines 614 that the entire message has been recorded and delivered, then the callee device 105 ends the session in step 620. If, on the other hand, the callee device 105 determines 614 that the entire message has not been recorded and delivered, the callee device 105 proceeds to step 604, where the callee device 105 again determines 604 whether or not the voice buffer is filled to capacity.

As the voice message is being recorded 616, the callee device 105 further determines, in step 618, whether or not the entire message has been recorded. If the entire message has been recorded, then the callee device 105 prepares, in step 608, an email and attaches the entire recorded voice message from the voice buffer to the prepared 608 email, and the process continues to the delivering step 610 as described above. If, on the other hand, the entire message has not been recorded, then the callee device 105 loops back to step 604, where the callee device 105 determines 604 whether or not the voice buffer is filled to capacity. The above steps are repeated until the entire message has been recorded and delivered, at which point the session ends in step 620. As shown in this embodiment, the segmentation of the voice message allows for long messages to be recorded and forwarded to a callee in smaller segments. The segmentation process also allows for a smaller allocation of memory for recorded voice messages, thereby reducing costs associated with adding memory.

One point to note here, however, is that if there is a problem with the email delivery (e.g., incorrect pre-determined address, email server unavailable, email disk quota exceeded, etc.), then the segmentation of the recorded voice message may not be an available alternative. Many of these problems may be circumvented by confirming the predetermined forwarding address prior to implementing the above method steps. Since confirmation of the predetermined forwarding address is described with reference to FIG. 2A, further discussion of this aspect of the invention is omitted here.

For those instances when it is determined that there is a problem with the email delivery, the callee device 105 may indicate to the caller that the buffer is reaching capacity. In these situations, the callee device 105 may return a pre-recorded voice prompt to the caller to indicate the amount of memory (i.e., message-recording time) available to the caller in recording the message. Thus, in the event that mail delivery is unsuccessful, the callee device 105 would, again, emulate a digital answering machine. Since digital answering machines and unsuccessful email delivery are well known in the art, further discussion of digital answering machines and unsuccessful email delivery is omitted here.

Once the message arrives at the destination (e.g., the email server 505) in segments, the system may reassemble the voice messages if the user does not wish to hear the entire message in multiple segments. This is shown in FIG. 6B.

FIG. 6B continues the process at some later time, when a callee is available to listen to recorded voice messages. While the message retrieval is shown in FIG. 6B as being performed wholly by the callee device 105, it will be clear to one of ordinary skill in the art that, in an alternative embodiment, the callee device 105 may poll an email server 505 (FIG. 5D) to check for email and receive email messages in a similar fashion as that shown in FIG. 5D. In any event, since the retrieval of email is well-known, only a cursory discussion of this process is described below. In this sense, it will be clear to one of ordinary skill in the art that any known email retrieval process may be employed to retrieve the email message, and, additionally, any known reconstruction technique may be used to reconstruct the segmented messages.

In the embodiment of FIG. 6B, the callee device 105 detects, in step 626, the received email. Upon detecting 626 the received email, the callee device 105 determines, in step 628, whether or not the voice message has been segmented and sent in multiple emails. If the callee device 105 determines 628 that no segmentation has occurred, then the callee device 105 retrieves, in step 630, the email having the recorded message attached. The retrieved 630 email is then opened, in step 632, and the voice message is played, in step 638. If, on the other hand, the callee device 105 determines 628 that segmentation has occurred, then the callee device 105 retrieves, in step 634, the multiple emails, wherein each of the multiple emails has a segment of the recorded voice message attached to the email. The voice message is then reconstructed, in step 636, from the retrieved 634 multiple emails, and the reconstructed message is played, in step 638. Once the message has been played, the process ends, in step 998. Since email message retrieval and data reconstruction are well known, further discussion of email retrieval and data reconstruction are omitted here.

The call controller 510, and any other logic component in FIG. 2A, can be implemented in hardware, software, firmware, or a combination thereof. In the preferred embodiment(s), the call controller 510 is implemented in software or firmware that is stored in a memory and that is executed by a suitable instruction execution system. If implemented in hardware, as in an alternative embodiment, the call controller 510 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternative implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention. For example, while the steps of transmitting 514 the voice message, receiving 520 the voice message, and recording 522 the voice message are shown in three consecutive steps, it will be clear to one of ordinary skill in the art that these three steps may be performed in substantial simultaneity. Additionally, while the steps of returning 508 the pre-recorded voice prompt and receiving 510 the pre-recorded voice prompt are shown as consecutive steps, it will be clear to one of ordinary skill in the art that these steps may be performed substantially concurrently. Furthermore, while the session initiation protocol (SIP) is presented as the Internet voice-messaging environment, it will be clear to one of ordinary skill in the art that the present invention may be used in any Internet telephony environment, or any environment dealing with digital voice recording and forwarding. Also, while FIG. 6A shows the determining steps 604, 618 and the recording step as sequential steps, it will be clear to one of ordinary skill in the art that these steps may be performed substantially concurrently. Additionally, it will be clear to one of ordinary skill in the art that, while the steps associated with recording 616 and the steps associated with preparing 608 and delivering 610 the email are shown as sequential steps, these steps may be performed in parallel.

Although an exemplary embodiment of the present invention has been shown and described, it will be apparent to those of ordinary skill in the art that a number of changes, modifications, or alterations to the invention as described may be made, none of which depart from the spirit of the present invention. For example, while specific procedures are presented for a session initiation protocol (SIP) environment, it will be clear to one of ordinary skill in the art that the call recording and forwarding system and method may be adapted to any type of Internet telephony environment, or, alternatively, adapted to any type of digital voice communication environment.

All such changes, modifications, and alterations should therefore be seen as within the scope of the present invention.

We claim:

1. A device, comprising:
an unavailability determiner configured to determine whether a first party is unavailable for an internet telephony session;
a voice message recorder configured to record a voice message in response to an unavailability of the first party;
a voice message segmentor configured to segment the voice message that is recorded into voice-message segments, each of the voice-message segments having a size that does not exceed a threshold capacity of a voice buffer;
an electronic message preparation logic configured to prepare electronic messages recursively for the voice-message segments, wherein each of the electronic messages corresponds to a separate one of the voice-message segments, wherein the electronic message preparation logic comprises:
a caller information logic configured to determine caller information;
an electronic message header logic configured to generate an electronic message header for each of the electronic messages, wherein each of the electronic messages is an email; and
a voice buffer attachment logic configured to attach each of the voice-message segments to the separate one of the electronic messages, wherein the electronic message preparation logic is further configured to forward the electronic messages to a predetermined forwarding address; and
a call controller configured to determine whether a proper delivery of each of the electronic messages has occurred, the call controller further configured to clear the voice buffer in response to a determination of the proper delivery of each of the electronic messages.

2. The device of claim 1, further comprising:
a program logic configured to store and control user-programmable features of the call controller, including settings for the unavailability of the first party.

3. A method for forwarding messages comprising:
determining an unavailability of a first party for an internet telephony session;
recording a voice message, wherein the recording the voice message comprises:
determining a threshold capacity of a voice buffer; and
segmenting the voice message into voice-message segments, each of the voice-message segments having a size that does not exceed the threshold capacity of the voice buffer; and
recursively repeating the following for each one of the voice-message segments until every segment of the voice message has been delivered:
storing a segment of the voice-message segments in the voice buffer;
attaching the segment of the voice message that is stored to an electronic message;

delivering the electronic message to a predetermined forwarding address; and clearing the voice buffer.

4. The method of claim 3, further comprising:

generating an electronic message header for the electronic message.

5. The method of claim 3, wherein the electronic message is a simple mail transfer protocol compatible electronic message.

6. A non-transitory computer readable storage medium encoded with a computer program, comprising:

a logic determining an unavailability of a first party for an internet telephony session;

a logic receiving a voice message from a first caller;

a logic recording the voice message in response to the unavailability of the first party;

a logic segmenting the voice message into voice-message segments, each of the voice-message segments having a size that does not exceed a threshold capacity of a voice buffer;

a logic recursively repeating the following for each of the voice-message segments until every segment of the voice message has been delivered:

storing a segment of the voice-message segments in the voice buffer;

attaching the segment that is stored in the voice buffer to an electronic message;

delivering the electronic message; and clearing the voice buffer;

a logic detecting electronic messages that have been delivered;

a logic retrieving the electronic messages that have been delivered;

a logic reconstructing the voice message that has been recorded from the electronic messages that have been retrieved; and a logic playing the voice message that has been reconstructed.

7. The non-transitory computer readable storage medium of claim 6, further comprising:

a logic generating an electronic message header for the electronic message.

8. The non-transitory computer readable storage medium of claim 6, further comprising:

a logic receiving a second voice message from a second caller through an established internet telephony session, wherein the second voice message is received in response to a returned pre-recorded voice prompt.

9. The non-transitory computer readable storage medium of claim 6, wherein the delivering the electronic message delivers the electronic message to a predetermined forwarding address.

* * * * *